United States Patent [19]

Gagliardi, Jr.

[11] Patent Number: 4,628,569

[45] Date of Patent: Dec. 16, 1986

[54] METHOD OF BUTCHERING A SIDE OF LAMB AND CUTS RESULTING THEREFROM

[75] Inventor: Eugene D. Gagliardi, Jr., West Chester, Pa.

[73] Assignee: Southdown Meat Company, Inc., West Chester, Pa.

[21] Appl. No.: 840,537

[22] Filed: Mar. 17, 1986

Related U.S. Application Data

[63] Continuation of Ser. No. 701,339, Feb. 13, 1985, abandoned.

[51] Int. Cl.⁴ .............................................. A22B 25/18
[52] U.S. Cl. .......................................... 17/52; 17/1 R
[58] Field of Search ............................ 17/1 R, 45, 52; 426/129, 480, 518, 645

[56] References Cited

PUBLICATIONS

National Livestock and Meat Board Lamb Chart.
"Slaughtering, Cutting and Processing Lamb & Mutton on the Farm", U.S. Dept. of Agriculture, Farmers' Bulletin No. 2152, 1965.
Excerpt from "The Meat Handbook", Albert Levie, The AVI Publishing Company, Inc., Westport, Conn. (1963).
Excerpt from "Meat Handbook", Albert Levie, AVI Publishing Company, Inc., Westport, Conn., (Fourth Edition, 1979).

*Primary Examiner*—John Sipos
*Assistant Examiner*—Steven P. Weihrouch
*Attorney, Agent, or Firm*—Panitch Schwarze Jacobs & Nadel

[57] ABSTRACT

A method of butchering a side of lamb into a plurality of meat cuts comprising cutting along a line running generally perpendicular to the backbone at the point where the hip bone joins the backbone to divide the side into a leg portion and a body portion. The shoulder and foreshank are removed and the body portion is cut along a substantially straight line running generally perpendicular to the ribs to sever a substantial portion of the ribs from the remainder of the body portion. The body portion is cut generally perpendicular to the backbone, slightly forward of the first rib, between the sixth and seventh ribs and beyond the thirteenth rib to divide the remaining body portion into a neck portion, first and second rack cuts, and a loin cut. The chine bone is removed from both rack cuts and the chine bone and backbones are removed from the loin cut. The rib cut is cut along the breastbone to remove the breastbone cartilage and flank portions to form a breast cut. The leg portion is cut along a line extending generally perpendicular to the hip bone about half-way along the length of the hip bone and along a line extending generally perpendicular to the hind shank bone at about the stifle joint to provide a hip cut, a leg cut, and a hind shank cut. The hip bone and aitch bone are removed from the leg cut and the leg bone is loosened so as to be easily removable.

9 Claims, 9 Drawing Figures

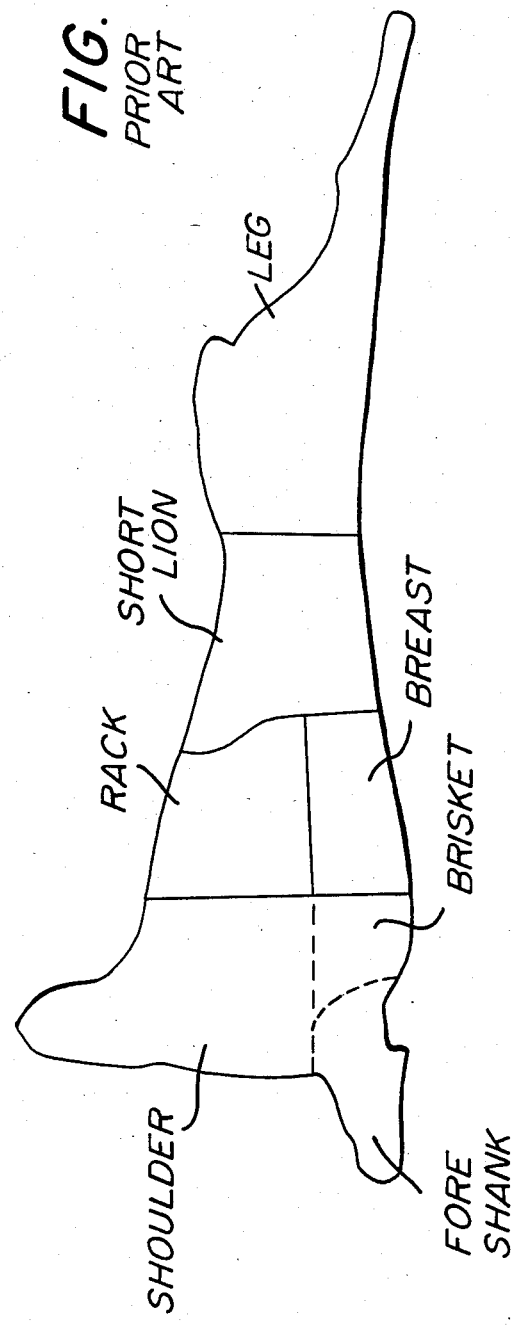
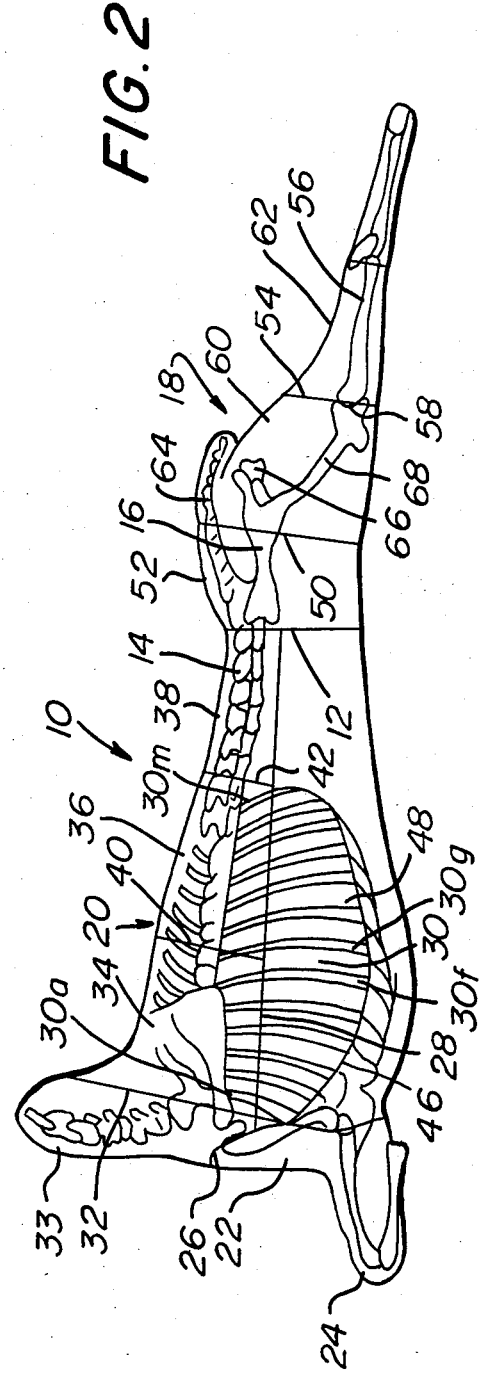

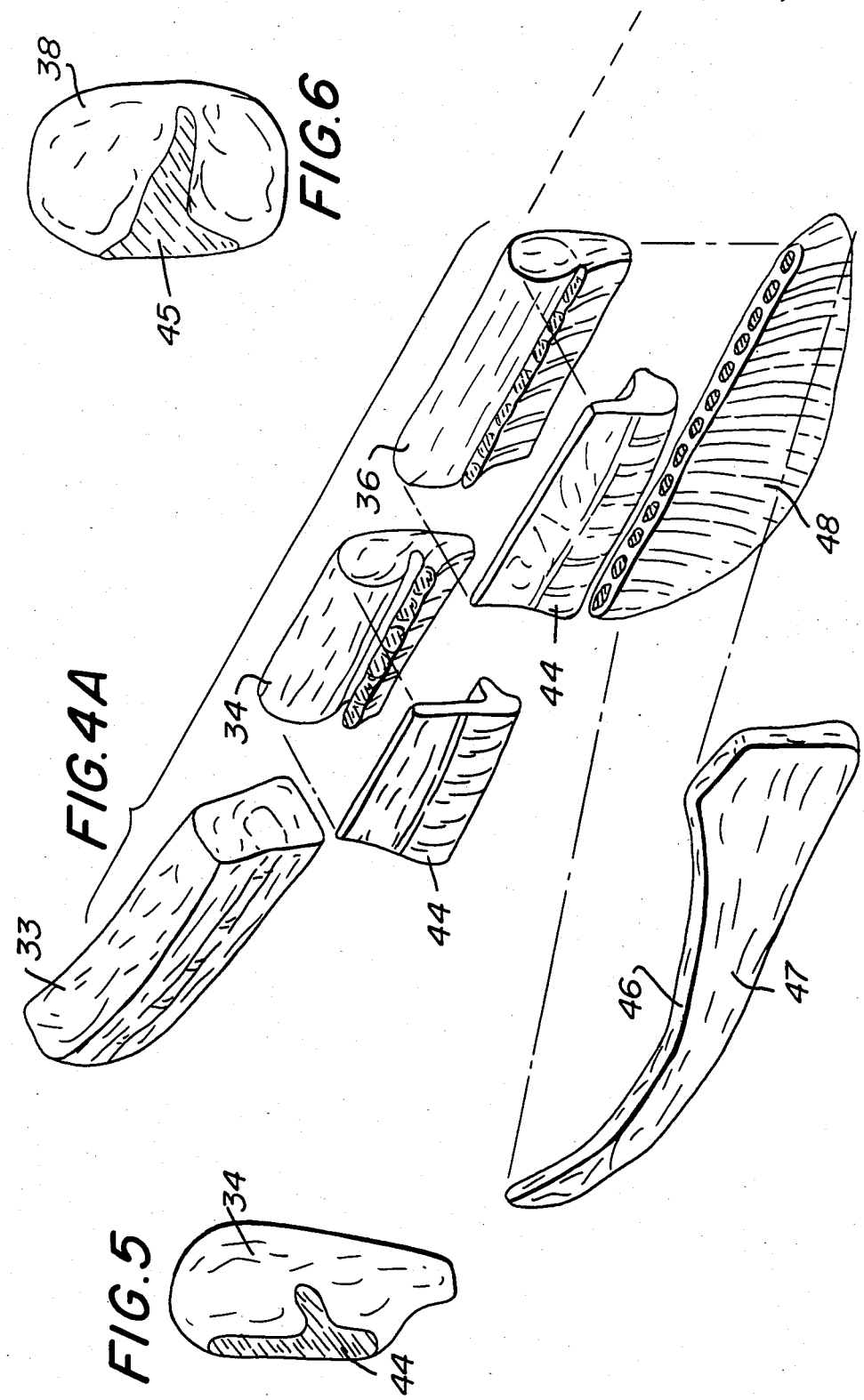

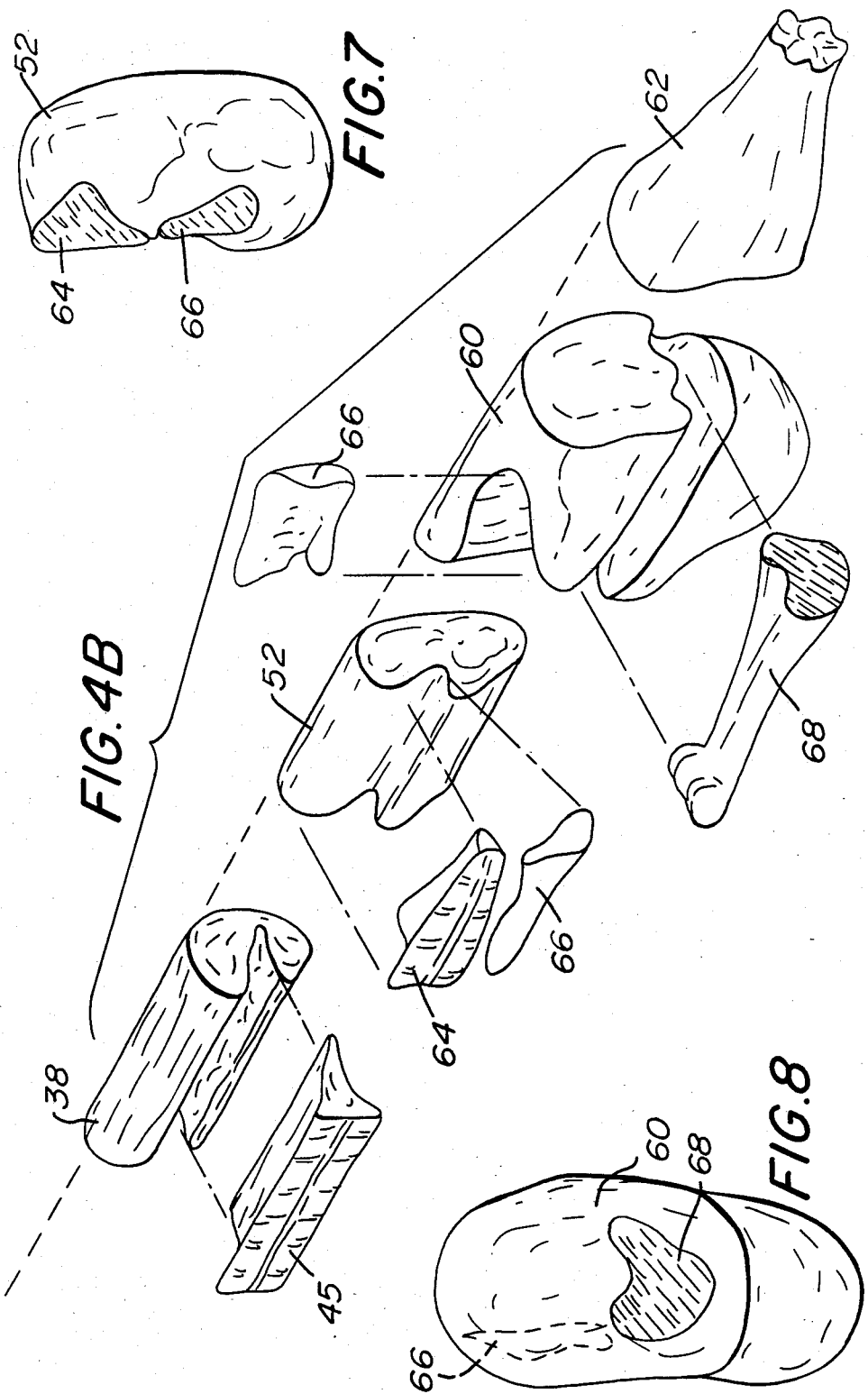

METHOD OF BUTCHERING A SIDE OF LAMB AND CUTS RESULTING THEREFROM

This application is a continuation of application Ser. No. 701,339, filed Feb. 13, 1985, now abandoned.

BACKGROUND OF THE INVENTION

The present invention relates generally to a method of butchering an animal carcass into edible meat products and, more particularly, to a method of butchering a side of lamb into a plurality of cuts of lamb meat.

Recently, the cost involved in obtaining, feeding, raising and bringing to market an edible animal, such as a lamb, has skyrocketed. Due to the tremendous increase in cost and, assuming that only reasonable increases may be made in the market price charged to the consumer for the lamb meat products without adversely affecting consumer demand, it has become increasingly important to more skillfully butcher the lamb in order to maximize the total meat yield.

In addition to maximizing the total meat yield from a lamb, consumer tastes have become more sophisticated and the butchering methods must be changed to suit consumer tastes. Consumers are now demanding new and different ways of purchasing and preparing lamb meat products. In addition, consumers are interested in obtaining and are willing to pay for lamb meat products in a boneless or semi-boneless form which is most convenient for their needs and which includes minimal waste.

In the past, the traditional manner of butchering a lamb or a lamb side has resulted in a number of lamb products or cuts such as the rack, loin and leg which are highly desirable by the consumer and a number of other cuts which have not gained much, if any, consumer acceptance. FIG. 1 shows a typical manner of butchering a side of lamb in accordance with the traditional prior art method. In the prior art butchering method, the leg portion is typically severed from the remainder of the side, approximately at the hip joint. Thereafter, the leg portion may be sold as a leg roast, with or without removing the bones. Alternatively, the hind shank portion may be separated from the remainder of the leg and the remaining leg portion may be cut into chops or steaks. In either event, there is a fair amount of meat wasted and, if the bones are left in, the various leg cuts are very difficult to carve and result in a significant amount of meat remaining on or around the bones which is disposed of with the bones.

The remaining portion of the lamb side is divided into the short loin, rack, shoulder, foreshank, brisket and breast cuts, substantially as shown in FIG. 1. The rack and short loin cuts could then be sold either as roasts or could be sliced into chops or steaks. The shoulder either could be cut into shoulder chops or boned to form a shoulder roast. Although there is generally good consumer demand for the rack and short loin cuts, the demand for the shoulder cuts is substantially less, due to the large proportion of bone in the case of the shoulder lamb chops and due to the relatively high price in the case of a boned shoulder roast.

The foreshank and brisket cuts, as well as the upper or neck end of the shoulder cut have traditionally been treated as secondary or by-product cuts. The value of these cuts has traditionally been low and they have generally been utilized in a braised dish or stew, or have been utilized to form ground lamb patties. Although the breast cut may be utilized for barbecuing or for stuffing, it, too, has traditionally been considered a by-product cut and has been afforded little value.

The present invention comprises a method of butchering a side of lamb into a plurality of cuts of lamb which provide additional useful meat with less waste and less ground meat. The new cuts are expected to gain greater consumer acceptance than the prior art butchering methods. The method of the present invention is relatively quick and easy to utilize and results in a plurality of cuts of lamb which are both appetizing and convenient for the consumer to handle.

SUMMARY OF THE INVENTION

Briefly stated, the present invention comprises a method of butchering a side of lamb into a plurality of cuts of lamb and the cuts formed by the method. The method comprises:

Cutting the side of lamb along a line running generally perpendicular to the backbone at a point where the hip bone joins the backbone to divide the side into a leg portion and a body portion.

The shoulder and foreshank are removed from the body portion and the body portion is cut along a substantially straight line extending generally perpendicular to the ribs and passing through the first rib, about one-half way along the length of the first rib and through the seventh rib, about one-third along the length of the seventh rib measuring from the backbone to sever a substantial portion of the ribs from the remainder of the body portion. The body portion is cut along a line extending generally perpendicular to the backbone slightly forward of the first rib to sever the neck portion from the remainder of the body portion.

The body is cut along a line extending generally perpendicular to the backbone between the sixth and seventh ribs to sever a first rack cut from the remainder of the body portion. The body is also cut along a line extending generally perpendicular to the backbone slightly beyond the thirteenth rib to divide the remaining body portion into a second rack cut and a loin cut. The chine bone is removed from the first and second rack cuts and the chine bone and backbone are removed from the loin cut.

The ribs are cut along the breastbone to remove the breastbone cartilage and the flank portions to form a breast cut. The leg portion is cut along a line extending generally perpendicular to the hip bone, about half-way along the length of the hip bone to sever a hip cut from the remainder of the leg portion. The leg portion is cut along a line extending generally perpendicular to the hind shank bone, at about the stifle joint, to divide the leg portion into a leg cut and a hind shank cut. The hip bone and the aitch bone are removed from the leg cut and the leg bone is loosened by an axial cut so as to be easily removable.

The invention further comprises the first rack cut, the breast cut and the leg cut which are formed in accordance with the above-described butchering method.

BRIEF DESCRIPTION OF THE DRAWINGS

The foregoing summary, as well as the following detailed description, will be better understood when read in conjunction with the appended drawings. For purposes of illustrating the invention, there is shown in the drawings an embodiment which is presently preferred, it being understood, however, that this invention is not limited to the precise arrangement shown. In the drawings:

FIG. 1 is a diagrammatic side elevation view of a side of lamb showing the approximate size and location of the various cuts of lamb meat in accordance with the prior art method of butchering;

FIG. 2 is a view similar to FIG. 1, partially in section, to diagramatically show the bone, but with cut lines added to show the method of butchering in accordance with the present invention and the relative size and location of the cuts of lamb meat formed employing the method;

FIG. 4A and FIG. 4B together form an exploded perspective view of the individual cuts of lamb meat of FIG. 3 showing the removed bones;

FIG. 5 is a sectional view of the first rack cut taken along line 5—5 of FIG. 4A, prior to the removal of the chine bone;

FIG. 6 is a sectional view of the loin cut taken along line 6—6 of FIG. 4B prior to the removal of the bones;

FIG. 7 is a sectional view of the leg cut taken along line 7—7 of FIG. 4B prior to the removal of the aitch and hip bones; and FIG. 8 is a sectional view of the hip cut taken along line 8—8 of FIG. 4B prior to the removal of the bones.

DESCRIPTION OF A PREFERRED EMBODIMENT

Figure 3:
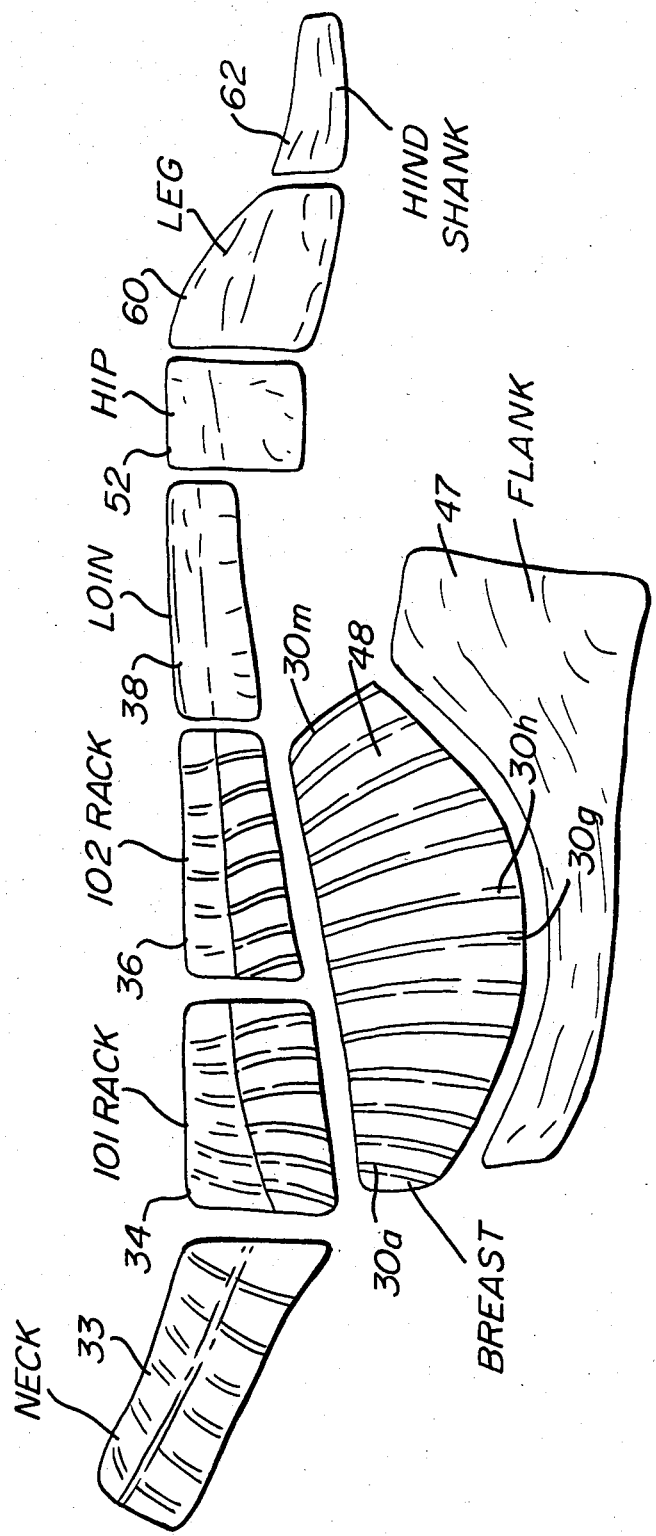
FIG. 3 is a slightly enlarged exploded side of a view of a portion of the lamb side of FIG. 2 showing the individual cuts of lamb meat with separations therebetween.

Referring in detail to the drawings, wherein like numerals indicate like elements throughout, there is shown in FIG. 2 a diagramatical side sectional elevational view of a side of lamb 10 showing the general location of the various bones. Traditionally, lamb carcasses are not split lengthwise into sides, but are butchered as a single carcass with some cuts, such as the hotel or double rack, being formed from both sides. For the sake of brevity, the present invention will be described with respect to a single side of lamb 10, it being understood that the invention has equal applicability to both sides of lamb. While, with the present invention, the lamb carcass is preferably initially split into the two individual sides prior to making the belowdescribed cuts, it should be understood that, if desired, the below-described cuts could be made concurrently to both sides of the lamb. Similarly, although the below-described cuts are described as being made in an order or sequence which is presently preferred, it should be understood and appreciated that the various cuts could be made in any other desired order or sequence to yield the same result. Therefore, the present invention is not limited to the particular order or sequence of cuts.

In the presently preferred embodiment, the side of lamb 10 is first cut along a generally straight line 12 running generally perpendicular to the backbone 14 at a point where the upper end of the hip bone 16 joins with the backbone 14. This first cut results in the lamb side 10 being divided or broken into a leg portion 18 and a body portion 20. Thereafter, the leg portion 18 and the body portion 20 are further divided into a plurality of individual cuts of lamb as described below, it being understood that either of the two portions could be cut first. The first cut is preferably made utilizing a power meat saw (not shown) such as an electrically powered band-type saw. However, the first cut could be made utilizing any other suitable implement or instrumentality, such as a handsaw or a knife (not shown).

In order to prepare the body portion 20 for the remaining cuts, the shoulder 22 and foreshank 24 are initially removed from the remainder of the body portion by cutting along line 26 in the manner well known in the art. Thereafter, the body portion is cut along a substantially straight line 28 extending generally perpendicular to the ribs 30 along the entire length of the body portion as shown. The cut may be made utilizing any conventional cutting means, such as a hand saw, but preferably is made by a standard electrically powered meat saw (not shown). As shown in FIG. 2, cut line 28 passes generally through the first rib 30a at about halfway along its length and through the seventh rib 30g at about one-third along its length when measured from the backbone 14. As shown in FIGS. 2 and 3, the cut line 28 severs a substantial portion of the ribs 30 from the remainder of the body portion 20.

The body portion is then cut along a line 32 extending generally perpendicular to the backbone 14 and slightly forward (toward the left when viewing FIG. 2) of the first rib 30a. This cut, as with the other cuts, may be made with a hand saw, powered meat saw, or any other known cutting means. In making the cut along line 32, the neck portion 33 is severed from the remainder of the body portion 20.

Once the above-described cuts have been made, the remainder of the body portion 20 is cut into a first or 101 rack cut 34, a second or 102 rack cut 36 and a loin cut 38 by cutting the body portion along lines 40 and 42, respectively. Cut line 40 extends generally perpendicular to the backbone 14 between the sixth and seventh ribs 30g and 30h, respectively, while cut line 42 extends generally perpendicular to the backbone slightly beyond or below (toward the right when viewing FIG. 2), the last or thirteenth rib 30m. The cuts along lines 40 and 42 could be made in any desired order to yield the same result.

As best seen in FIGS. 4A and 5, the chine bone 44 may be removed from both the first and second rack cuts 34 and 36, respectively. Similarly, as shown in FIG. 4B and 6, the "T" bone 45 (chine bone 44 and backbone 14) may be removed from the loin cut 38, leaving the loin fully boneless. Thereafter, the two rack cuts 34 and 36 may be maintained as they are for roasting, or may be sliced into chops (not shown). With the chine bone 44 removed, it is much easier to carve or cut the rack cuts 34 and 36 either before or after cooking, and there is much less wasted meat. In addition, unlike the rack cut of the prior art, the rack cuts 34 and 36 of the present invention include practically no ribs. The rib portion of the prior art rack cut was generally included for decoration and the meat of the ribs was often wasted.

Similarly, the loin cut 38 may be prepared as a boneless roast or may be sliced into chops or steaks (not shown). Since the loin cut 38 is boneless, carving is much easier and there is considerably less waste.

The portion of the ribs 30 which was previously separated from the body portion 18 is cut along the breastbone 46 at the distal end tips of the individual rib bones 30 to separate the breastbone 46 and rib cartilage and the flank portion 47 as shown in FIGS. 3 and 4A. Unlike the breast cut of the prior art method which contained marginal meat, the resulting breast cut 48 is comprised of a substantial portion of all thirteen of the ribs 30 and contains a significant amount of meat. The breast cut 48 may be barbecued, stuffed or prepared in any other traditional or innovative manner.

Turning now to the leg portion 18, a cut is made along a line 50 extending generally perpendicular to the hip bone 16 about half-way along the length of the hip bone 16 to sever a hip cut 52 from the remainder of the leg portion 18. Again, the cut may be made utilizing an electric saw (not shown), handsaw (not shown) or any other suitable means. The leg portion 18 is further cut along another line 54 extending generally perpendicular to the hind shank bone 56 at about the stifle joint 58 to provide a leg cut 60 and a hind shank cut 62. The hip bone 16, backbone 14 and tail bone 64 are removed from the hip cut 52 to provide a boneless head loin or hip cut which is suitable for roasting or may be sliced into boneless steaks or chops, if desired. The hip bone 16 and the aitch bone 66 are similarly removed from the leg cut 60. In addition, the leg bone 68 is loosened from the leg cut 60 by cutting or nickihg the meat axially along the bone 68. In this manner, the leg bone 68 remains in the leg cut 60 to provide stability during cooking. After cooking, the leg bone 68 can be conveniently removed after cooking to facilitate convenient slicing or carving with little or no waste and without having to worry about cutting around the leg bone 68.

The shoulder 22, foreshank 24, neck 33, flank 46 and the hind shank 62 are boned to remove any usable meat. The removed meat may then be used to form meat cubes, or kabobs, or may be ground either by itself or in combination with other meat, spices or the like to produce a ground meat product which may then be formed into patties, meat loafs, or the like (not shown).

From the foregoing description, it can be seen that the present invention comprises a new and unique method of butchering lamb into a plurality of cuts of lamb meat. The invention also comprises three new cuts of lamb meat which are formed by the method. The method is relatively quick and easy to employ for butchering a lamb and the resulting meat products result in a more efficient utilization of the available meat to provide additional valuable meat products with considerably less by-products or waste than that of the prior art method of butchering a lamb. It will be recognized by those skilled in the art that changes could be made to the above-described embodiment of the invention without departing from the broad inventive concepts thereof. For example, the order in which the cuts are made could be altered. It is understood, therefore, that this invention is not limited to the particular embodiment disclosed, but it is intended to cover any modifications which are within the spirit and scope of the invention as defined by the appended claims.

I claim:

1. A method of butchering a side of lamb into a plurality of cuts of lamb comprising:
    cutting along a line running generally perpendicular to the backbone at the point where the hip bone joins the backbone, to divide the side into a leg portion and a body portion;
    removing the shoulder and foreshank;
    cutting along a substantially straight line generally perpendicular to the ribs and passing through the first rib about one-half way along the length of the first rib and through the seventh rib about one-third along the length of the seventh rib measured from the backbone, the cut extending along the entire length of the body portion to sever a substantial portion of the ribs from the remainder of the body portion;
    cutting along a line slightly forward of the first rib, and extending generally perpendicular to the backbone to sever the neck from the remainder of the body portion;
    cutting along a line between the sixth and seventh ribs and extending generally perpendicular to the backbone to sever a first rack cut from the body portion; and
    cutting along a line slightly beyond the thirteenth rib and extending generally perpendicular to the backbone to divide the remaining body portion into a second rack cut and a loin cut.

2. The method as recited in claim 1 further including removing the chine bone from the first rack cut and second rack cut and removing the chine bone and the backbone from the loin cut.

3. The method as recited in claim 1 further including cutting the severed ribs along the breastbone to remove the breastbone cartilage and the flank portions to form a breast cut.

4. The method as recited in claim 3 further including cutting along a line extending generally perpendicular to the hip bone about half-way along the length of the hip bone to sever a hip cut from the remainder of the leg portion;
    cutting along a line extending generally perpendicular to the hind shank bone at about the stifle joint to divide the remainder of the leg portion into a leg cut and a hind shank cut; and
    removing the hip bone and the aitch bone from the leg cut and loosening the leg bone by an axial cut so as to be easily removable.

5. The method as recited in claim 4 further including removing the meat from the neck, shoulder, flank, front shank and hind shank portions to form ground meat, meat cubes and kabobs.

6. A first rack cut of lamb formed from a side of lamb by the method comprising:
    cutting along a line generally perpendicular to the ribs and passing through the first rib about one-half way along the length of the first rib and at least through the seventh rib about one-third along the length of the seventh rib measured from the backbone to sever a substantial portion of the ribs from the remainder of the side of lamb;
    cutting along a line slightly forward of the first rib and extending generally perpendicular to the backbone to sever the neck from the remainder of the side of lamb; and
    cutting along a line between the sixth and seventh ribs and extending generally perpendicular to the backbone to sever a first rack cut from the side of lamb.

7. The rack cut as recited in claim 6 formed by removing the chine bone from the first rack.

8. A breast cut of lamb formed from a side of lamb by the method comprising:
    removing the shoulder and foreshank from the side of lamb;
    cutting along a line generally perpendicular to the backbone at the point where the hip bone joins the backbone to divide the side into a leg portion and a body portion;
    cutting along a substantially straight line generally perpendicular to the ribs and passing through the first rib about one-half way along the length of the first rib and through the seventh rib about one-third along the length of the seventh rib measured from the backbone to sever a substantial portion of the ribs from the remainder of the body portion;

cutting the severed rib portion along the breastbone to remove the breastbone cartilage and the flank portions to form the breast cut.

9. A leg cut of lamb formed from a side of lamb by the method comprising:

cutting along a line generally perpendicular to the backbone at the point where the hip bone joins the backbone to divide the side into a leg portion and a body portion;

cutting along a line extending generally perpendicular to the hip bone about half-way along the length of the hip bone to sever a hip cut from the remainder of the leg portion;

cutting along a line extending generally perpendicular to the hind shank bone at about the stifle joint to divide the remaining leg portion into a leg cut and a hind shank cut; and removing the hip bone and the aitch bone from the leg cut and loosening the leg bone so as to be easily removable.

* * * * *